April 25, 1933.  M. P. TELLER  1,905,014
COMBINED SHUT-OFF AND TRIP VALVE
Filed March 31, 1932  2 Sheets-Sheet 1

WITNESS:

INVENTOR
Martin P. Teller
BY
Augustus B. Stoughton
ATTORNEY.

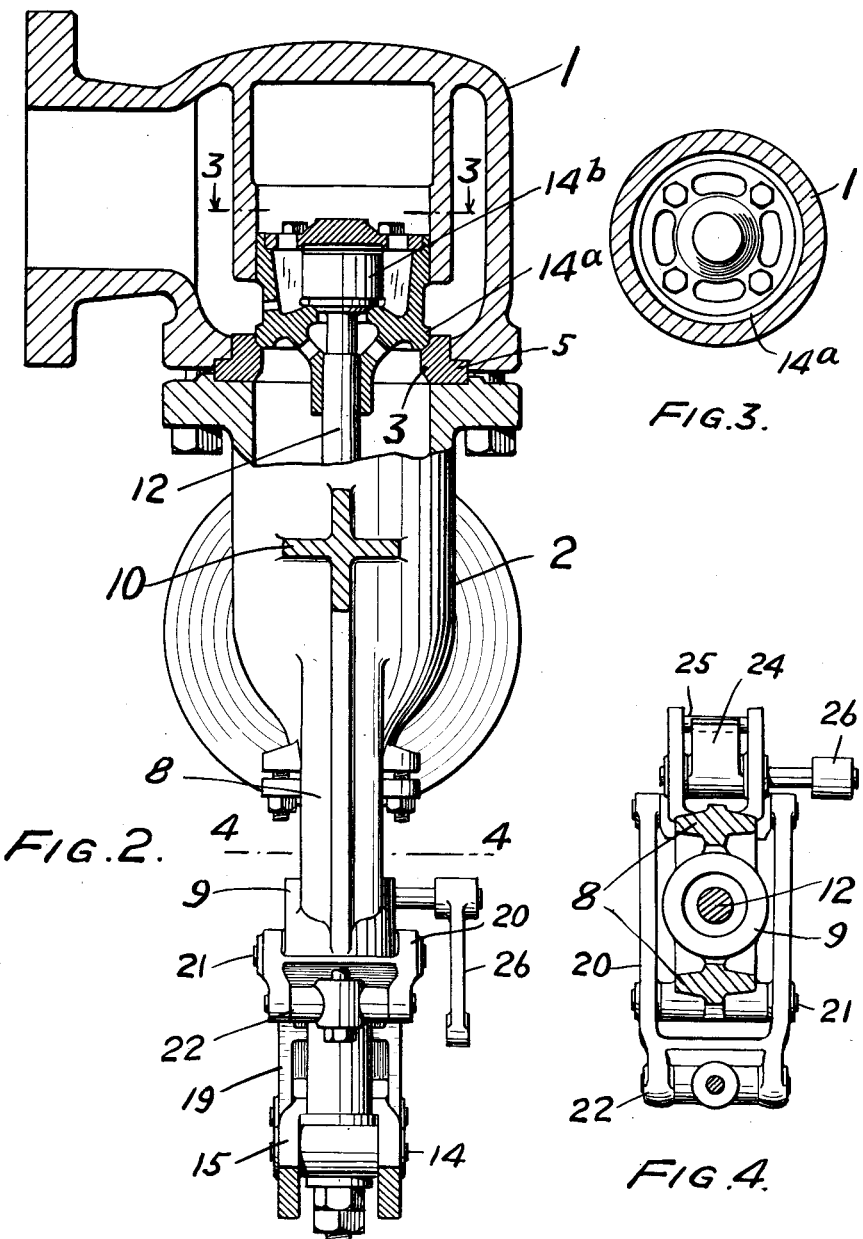

Patented Apr. 25, 1933

1,905,014

UNITED STATES PATENT OFFICE

MARTIN P. TELLER, OF PHILADELPHIA, PENNSYLVANIA, ASSIGNOR TO SCHUTTE & KOERTING COMPANY, OF PHILADELPHIA, PENNSYLVANIA, A CORPORATION OF PENNSYLVANIA

COMBINED SHUT-OFF AND TRIP VALVE

Application filed March 31, 1932. Serial No. 602,162.

The present invention relates to improvements in the structure of such valves, and among its objects reference may be made to the following to provide that proper alignment of the various working parts may be easily obtained and permanently secured, to insure long life, and to save space.

Other objects of the invention will appear from the following description at the end of which the invention will be claimed.

Generally stated, the invention comprises an upper or inlet valve body or section, a lower or outlet body or section, a valve seat ring clamped at the joint between the bodies or sections, the outlet or lower section being provided integrally with the valve yoke which carries the operating gear and with the arm or bracket that carries the hand wheel shaft.

The invention also comprises the improvements to be presently described and finally claimed.

In the following description reference will be made to the accompanying drawings forming part hereof and in which Figure 1 is a side elevational view principally in section of a valve embodying features of the invention showing the same in shut position with the trip latched.

Fig. 2 is a view taken in part on the line 2—2 of Fig. 1 and illustrating a modification in which there is a side inlet.

Fig. 3 is a section on the line 3—3 of Fig. 2, and

Fig. 4 is a section on the line 4—4 of Fig. 2.

Figure 1:
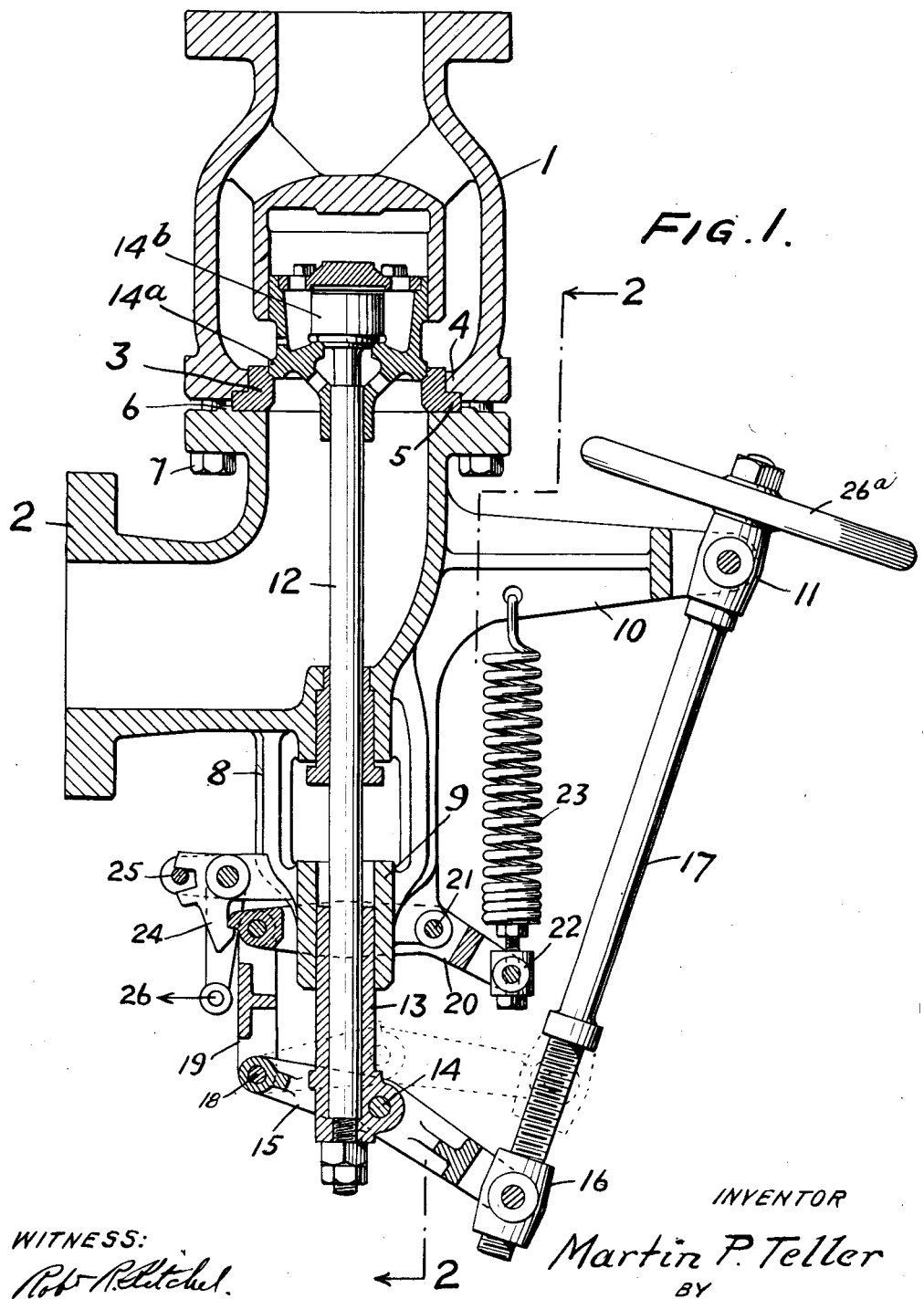

Referring to the drawings the upper or inlet section of the valve is indicated at 1. 2 indicates the lower of outlet section or body of the valve. 3 is a valve seat ring clamped at the joint between the bodies or sections. The upper section 1 is provided with an inward flange or lip 4, and the valve seat ring 3 is provided with an outward flange 5. The flange 5 on the valve ring 3 is clamped between the flange 4 and the top part of the section 2, the raised ring 6 serving as a guide. The parts 1 and 2 are bolted together by the bolts 7. The lower section 2 is integrally provided with a yoke 8 carrying an integral guide sleeve 9 and serving as a support for linkage to which further reference will be made. The lower section 2 is also integrally provided with a bracket 10 which carries the hand wheel shaft bearing 11. By the described construction the objects set forth at the beginning of this description are attained. 12 is the valve spindle, and it is mounted in a tube 13 slidable in the sleeve 9. 14$^a$ is the main valve and 14$^b$ is the pilot valve, and there is lost motion between them. There is nothing particularly new about this construction and it need not be further described except to say that in opening the valve the pilot valve is first opened and then the main valve. While there is nothing particularly new about the linkage, it may be briefly described as follows:

The tube 13 connected with the valve spindle is pivoted at 14 to the intermediate portion of a lever 15 of which one end is pivoted to a nut 16 on the hand wheel shaft 17, and of which the other end 18 is pivoted to a link 19 which in turn is pivoted to one end of a latch lever 20, pivoted to the yoke 8 at 21, and of which the other end 22 is connected with a spring 23 attached to the bracket 10. There is a latch 24 pivoted to the yoke 8 or, more accurately, to a suitable projection thereon, and the latch 24 by a turning movement is adapted to engage and disengage the latch lever 20. 25 is a stop for limiting the movement of the latch 24, and 26 is an arm on the shaft of the latch 24, and by which it is operated. The arm 26 may be operated in any convenient way, for example, by means of a turbine governor, not shown because too well understood to require illustration or description. With the valve in closed position and by means of the hand wheel 26$^a$, the lever 15 is turned about the point 18 into the dotted line position, thus opening the valve. By reverse movement the valve can be closed. In that way the valve can be operated as a shut off valve.

Assuming the valve to be in open position with the lever 15 in the position indicated by dotted lines, the valve can be tripped closed by tripping the latch 24. In the closing movement the lever 15 turns about the nut as a fulcrum, the point 18 drops, and the end 22 of the lever 20 rises under the influence of the spring 23, thus the valve is closed. To reset the latch 24 when the valve is in closed position, the hand wheel 26ª is turned in the reverse direction, lowering the nut 16, raising the point 18, and through the link 19 the end of the lever 20, whereupon the latch 24 swings under and engages the lever 20 holding it in the position shown in the drawings.

With the exception of the fact that the fluidway enters from the side instead of the top, the construction and mode of operation of the modification shown in Fig. 2 are as has been above described.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. In a shut off and trip valve the combination of an upper or inlet valve body or section, a lower or outlet valve body or section, a valve seat ring clamped at the joint between the bodies or sections, the outlet body or section being integrally provided with a valve yoke and with a bracket, valve operating gear carried by the yoke, and a hand wheel shaft carried by the bracket for actuating said gear.

2. In a shut off and trip valve the combination of an upper or inlet valve body or section, a lower or outlet valve body or section, a valve seat ring clamped at the joint between the bodies or sections, the outlet body or section being integrally provided with a valve yoke and with a bracket, valve operating gear carried by the yoke, a hand wheel shaft carried by the bracket for actuating said gear, a projection integrally provided on the yoke, and a latch pivoted to the projection for cooperation with said gear.

MARTIN P. TELLER.